US012722799B2

(12) United States Patent
Stone et al.

(10) Patent No.: US 12,722,799 B2
(45) Date of Patent: Sep. 1, 2026

(54) AIRPORT TUGS, SYSTEMS, AND METHODS OF OPERATION THEREOF

(71) Applicant: Utah Valley University, Orem, UT (US)

(72) Inventors: Brett Stone, Lehi, UT (US); Matthew James Jensen, Salt Lake City, UT (US)

(73) Assignee: Utah Valley University, Orem, UT (US)

( * ) Notice: Subject to any disclaimer, the term of this patent is extended or adjusted under 35 U.S.C. 154(b) by 786 days.

(21) Appl. No.: 17/978,644

(22) Filed: Nov. 1, 2022

(65) Prior Publication Data

US 2023/0135561 A1 May 4, 2023

Related U.S. Application Data

(60) Provisional application No. 63/274,220, filed on Nov. 1, 2021.

(51) Int. Cl.
*B64F 1/228* (2024.01)
*B64F 1/00* (2024.01)

(52) U.S. Cl.
CPC .............. *B64F 1/228* (2013.01); *B64F 1/002* (2013.01)

(58) Field of Classification Search
CPC ........... B64F 1/228; B64F 1/002; Y02T 50/80
See application file for complete search history.

(56) References Cited

U.S. PATENT DOCUMENTS 8,694,238 B2 * 4/2014 Venkatasubramanian .................. G08G 5/727 244/50
2002/0173904 A1 * 11/2002 Dow ........................ G08G 5/56 701/120
2010/0140392 A1 * 6/2010 Perry ........................ B64F 1/22 244/50
2011/0073388 A1 * 3/2011 Andres .................. B64F 1/224 244/50

(Continued)

OTHER PUBLICATIONS

Frank et al, S. Sensor Concept for Highly-Automated Airport Tugs for Reduced Emission Taxi Operations, Google Scholar, 30th Congress of the International Council of the Aeronautical Sciences, Sep. 2016, pp. 1-9. (Year: 2016).*

(Continued)

*Primary Examiner* — Russell Frejd
(74) *Attorney, Agent, or Firm* — Workman Nydegger

(57) ABSTRACT

An exemplary airport tug is configured to navigate an airport facility autonomously. The exemplary airport tug may comprise a coupling portion configured to engage with a receiving portion of an aircraft, one or more sensors configured to collect sensor data descriptive of environmental conditions in a vicinity of the airport tug, a memory storing instructions, and one or more processors communicatively coupled to the memory and configured to execute the instructions to perform a process comprising: monitoring, based on the sensor data, the environmental conditions in the vicinity of the airport tug; and directing, based on the monitoring of the environmental conditions and while the coupling portion is engaged to the receiving portion, autonomous movement of the airport tug to transport the aircraft from a starting position to a designated delivery position for the aircraft at the airport facility.

19 Claims, 10 Drawing Sheets

(56) References Cited

U.S. PATENT DOCUMENTS

| | | | | |
|---|---|---|---|---|
| 2011/0224845 | A1* | 9/2011 | Perry | B64F 1/10<br>701/99 |
| 2013/0238214 | A1* | 9/2013 | Perry | B64F 1/227<br>701/99 |
| 2013/0333971 | A1* | 12/2013 | Perry | B64F 1/227<br>180/167 |
| 2019/0202579 | A1* | 7/2019 | Costello | B60L 53/12 |
| 2020/0033872 | A1* | 1/2020 | Burch, V | G05D 1/024 |
| 2021/0147202 | A1* | 5/2021 | Black | G05D 1/0212 |
| 2021/0397196 | A1* | 12/2021 | Burch, V | G05D 1/0088 |

OTHER PUBLICATIONS

Morris et al, R. SafeTug: Semi-Autonomous Aircraft Towing Vehicles, Google Scholar, NASA/Select Report Type, Mar. 2015, pp. 1-86. (Year: 2015).*

Sirigu et al, G. A Route Selection Problem Applied to Auto-Piloted Aircraft Tugs, Google Scholar, WSEAS Transactions on Electronics, 2017, pp. 27-40. (Year: 2017).*

Morris et al, R. Planning, Scheduling and Monitoring for Airport Surface Operations, Google Scholar, The Workshops of the Thirtieth AAAI Conference on Artificial Intelligence Planning for Hybrid Systems: Technical Report WS-16-12, 2016, pp. 608-614. (Year: 2016).*

Bijjahalli et al, S. A Novel Vehicle-Based GNSS Integrity Augmentation System for Autonomous Airport Surface Operations, Google Scholar, Journal of Intelligent & Robotic Systems, vol. 87, Apr. 2017, pp. 379-403. (Year: 2017).*

* cited by examiner

AIRPORT TUGS, SYSTEMS, AND METHODS OF OPERATION THEREOF

RELATED APPLICATIONS

The present application claims priority under 35 U.S.C. § 119(e) to U.S. Provisional Patent Application No. 63/274,220, filed on Nov. 1, 2021, which is incorporated herein by reference in its entirety.

BACKGROUND INFORMATION

Airport tugs are ground vehicles used to push or pull an airplane on a tarmac. Conventional tugs are operated by a human driver, are powered by an internal combustion engine, and are typically used to move an airplane away from an airport terminal. After the aircraft has been pushed away from the terminal, the aircraft uses its jet engines to taxi to a runway for takeoff. However, these conventional tugs must be driven by an onboard human driver, produce undesirable emissions and noise, and are only meant to move the aircraft relatively short distances.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Figure 1:
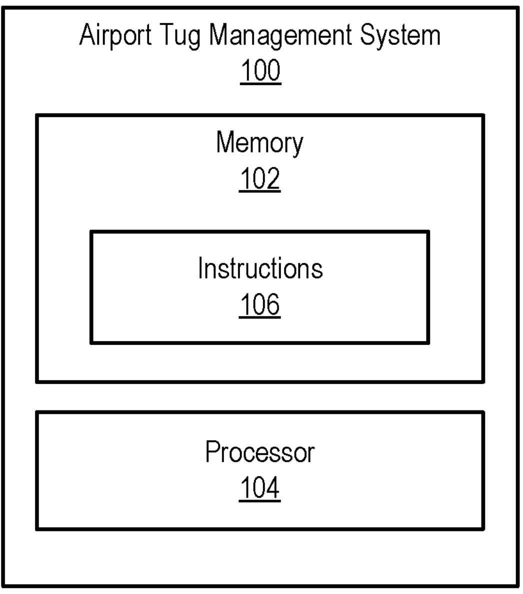
FIG. 1 illustrates an exemplary airport tug management system according to principles described herein.

Airport tugs, systems, and methods of operation thereof are described herein. In certain examples, an airport tug such as described herein may be configured to navigate an airport facility autonomously. In certain examples, for instance, an exemplary airport tug may comprise a coupling portion configured to engage with a receiving portion of an aircraft, one or more sensors configured to collect sensor data descriptive of environmental conditions in a vicinity of the airport tug, a memory storing instructions, and one or more processors communicatively coupled to the memory and configured to execute the instructions to perform a process. The process may comprise monitoring, based on the sensor data, the environmental conditions in the vicinity of the airport tug and directing, based on the monitoring of the environmental conditions and while the coupling portion is engaged to the receiving portion, autonomous movement of the airport tug to transport the aircraft from a starting position to a designated delivery position for the aircraft at the airport facility.

A form factor of airport tugs such as those described herein may be similar to the form factor of conventional airport tugs used at airports. However, airport tugs such as those described herein may differ from conventional airport tugs in one or more ways. For example, as will be described further herein, airport tugs such as those described herein may be electrically powered, may have one or more sensors or sensor arrays for collecting sensor data about environmental conditions, may be configured to autonomously navigate an airport environment, and/or may be configured to optionally switch to remote control operation in certain situations to navigate the airport environment as directed by a remote operator (e.g., that is located within a cockpit of an aircraft, within a control tower, on the tarmac, or any other suitable location). Other differences between the airport tugs described herein and conventional airport tugs will be evident from the description that follows.

Various advantages and benefits are associated with the airport tugs, systems, and methods described herein. Such benefits may be provided to airlines, airports, airport workers, travelers, those who live near airports, and to the public generally. For example, airliner emissions may be significantly reduced, on the order of 10% or more per flight in some implementations, by eliminating the need to use the aircraft's jet engines during pre-take-off operations and/or post-landing operations, especially taxiing. In addition, in examples where airport tugs such as those described herein operate by way of electric power, the airport tugs may leverage the use of renewable energy to power the moving of aircraft around airport tarmacs. Electricity is also significantly less expensive than jet fuel, thus reducing costs. Jet engines are also noted for the high levels of noise they produce, and so by reducing the amount of time the engines are running, noise at and around airport facilities may be meaningfully reduced. These and other benefits that may be provided by the airport tugs, systems, and methods described herein will be evident from the disclosure that follows.

FIG. 1 illustrates an exemplary airport tug management system 100 ("system 100") that may be implemented according to principles described herein. As shown, system 100 may include, without limitation, a memory 102 and a processor 104 selectively and communicatively coupled to one another. Memory 102 and processor 104 may each include or be implemented by hardware and/or software components (e.g., processors, memories, communication interfaces, instructions stored in memory for execution by the processors, etc.). In some examples, memory 102 and/or processor 104 may be implemented by any suitable computing device. In other examples, memory 102 and/or processor 104 may be distributed between multiple devices and/or multiple locations as may serve a particular implementation. Illustrative implementations of system 100 are described herein.

Memory 102 may maintain (e.g., store) executable data used by processor 104 to perform any of the operations described herein. For example, memory 102 may store instructions 106 that may be executed by processor 104 to perform any of the operations described herein. Instructions 106 may be implemented by any suitable application, software, code, and/or other executable data instance.

Memory 102 may also maintain any data received, generated, managed, used, and/or transmitted by processor 104.

Memory 102 may store any other suitable data as may serve a particular implementation. For example, memory 102 may store data associated with airport facilities (e.g., terminal/runway maps), aircraft information, sensor data, airport navigation rulesets/algorithms, air traffic control information (e.g., vector information of entities (e.g., aircraft, airport personnel, airport tugs, transport vehicles, etc.) at or within a vicinity of an airport facility), and/or any other suitable data.

Processor 104 may be configured to perform (e.g., execute instructions 106 stored in memory 102 to perform) various processing operations associated with an airport tug autonomously navigating an airport facility. For example, processor 104 may perform one or more operations described herein to monitor environmental conditions within a vicinity of an airport tug and autonomously or automatically adjust movement of the airport tug based on the environmental conditions. As used herein, the expressions "autonomously" or "automatically" mean that an operation (e.g., an operation of autonomously transporting an aircraft) or series of operations are performed without requiring further input from a user. For example, system 100 may autonomously plot a route for an airport tug to follow at an airport facility and direct the airport tug to autonomously navigate along the route without requiring input from a user. These and other operations that may be performed by processor 104 are described herein.

Figure 2:
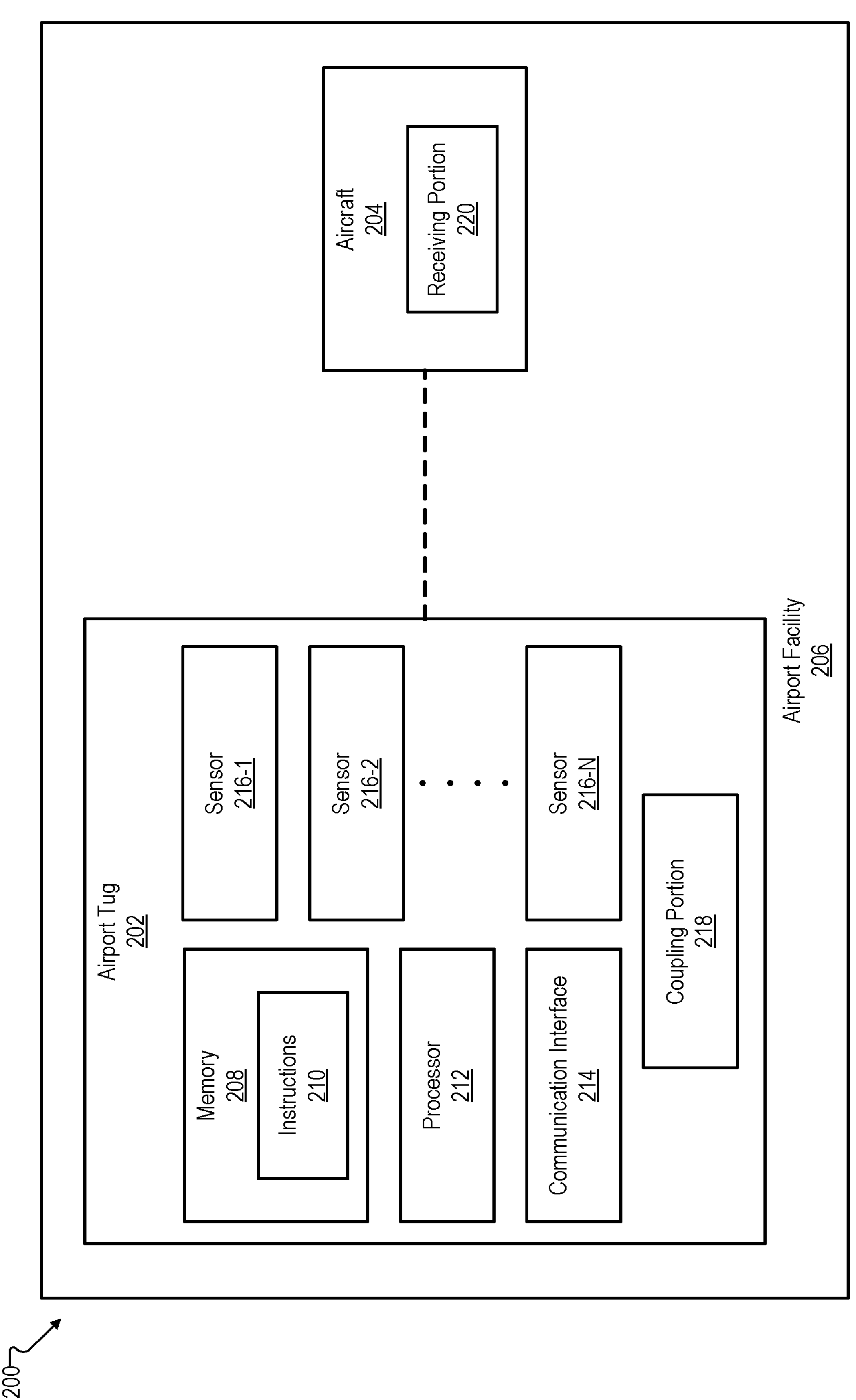
FIGS. 2-3 illustrate exemplary implementations of the airport tug management system of FIG. 1 according to principles described herein.

System 100 may be implemented in any suitable manner. FIG. 2 shows an exemplary implementation 200 in which system 100 may be provided in certain examples. As shown in FIG. 2, implementation 200 includes an airport tug 202 that is configured to engage with an aircraft 204 to facilitate transport of an aircraft 204 at an airport facility 206. System 100 may be implemented entirely by airport tug 202. Alternatively, system 100 may be distributed across airport tug 202 and aircraft 204, or distributed across airport tug 202, aircraft 204, and/or any other suitable computer system/device.

Aircraft 204 may correspond to any suitable type of aircraft that may be transported by airport tug 202. For example, aircraft 204 may correspond to any type of airplane (e.g., a commercial jet, a private jet, a military jet, etc.), helicopter, drone, or vertical take-off and landing (VTOL) aircraft.

As shown in FIG. 2, airport tug 202 includes, but is not limited to, a memory 208 that stores instructions 210, a processor 212, a communication interface 214, a plurality of sensors 216 (e.g., sensors 216-1 through 216-N) and a coupling portion 218.

Memory 208 may maintain (e.g., store) executable data used by processor 212 to perform any of the operations described herein. For example, memory 208 may store instructions 210 that may be executed by processor 212 to perform any of the operations described herein. Instructions 210 may be implemented by any suitable application, software, code, and/or other executable data instance.

Memory 208 may also maintain any data received, generated, managed, used, and/or transmitted by processor 212. Memory 208 may store any other suitable data as may serve a particular implementation. For example, memory 208 may store data similar to that stored by memory 102 described above.

Processor 212 may be configured to perform (e.g., execute instructions 210 stored in memory 208 to perform) various processing operations associated with airport tug 202 autonomously navigating airport facility 206. For example, processor 212 may perform one or more operations described herein to autonomously engage with and/or transport aircraft 204 at airport facility 206. These and other operations that may be performed by processor 104 are described herein.

Communication interface 214 may implement any suitable wireless or wired communication technology to communicate with other airport tugs, aircraft 204, an air traffic control system, and/or any other suitable entity at airport facility 206. For example, by way of communication interface 214, airport tug 202 may receive information from an air traffic control system regarding transport instructions and/or traffic conditions at airport facility including, for example, vectors of other airport tugs, vectors of other airport vehicles, vectors of aircraft, etc. at airport facility 206. In certain examples, communication interface 214 may be configured to wirelessly communicate with a remote control device operated by a remote operator and configured to remotely control airport tug in instances such as described herein where airport tug 202 is not operating autonomously.

Sensors 216 may be configured to collect sensor data descriptive of environmental conditions in a vicinity of airport tug 202. Sensors 216 may include any suitable number and/or type of sensor that may be used to facilitate navigation of airport tug 202 at airport facility 206. For example, sensors 216 may include, but are not limited to, light detection and ranging (LiDAR) sensors (e.g., rotating and/or solid state LiDAR sensors), ultrasonic sensors, radar sensors (e.g., using short range radar and/or long range radar), cameras (e.g., mono and/or stereo cameras), GPS sensors, and/or any other suitable type of sensor. Sensors 216 may be configured in any suitable manner to facilitate airport tug 202 identifying and using landmarks and features common to airport facility 206, such as the edges of runways or pavement, tarmac markers, lights, posts, etc. to facilitate airport tug 202 autonomously navigating airport facility 206.

Coupling portion 218 may include any suitable mechanism that may be configured to engage with aircraft 204 to facilitate airport tug 202 pushing or pulling aircraft 204 at airport facility 206. To that end, aircraft 204 includes a receiving portion 220 that is configured to engage in any suitable manner with coupling portion 218 of airport tug 202. For example, in certain implementations, receiving portion 220 may correspond to the front landing gear of aircraft 204. In such an example, coupling portion 218 may be configured to attach in any suitable manner to the front landing gear to push/pull aircraft 204 at airport facility 206.

Airport tug 202 may have any suitable form factor and may include any suitable additional or alternative components as may serve a particular implementation. For example, airport tug 202 may include a plurality of wheels (e.g., four wheels) and may include one or more actuators configured to control movement functions (e.g., braking, acceleration, steering, etc.) of airport tug 202. In certain implementations, airport tug 202 may be electrically powered. In such examples, airport tug 202 may have one or more electric motors and batteries configured to provide power to the electric motors. In addition, airport tug 202 may include a computer screen for manual interfacing and charging interface equipment (such as a plug-in charging port and/or inductive charging equipment). In some implementations, airport tug 202 may include manual control interfaces (e.g., a steering wheel, a brake pedal, an acceleration petal, etc.) to facilitate a human rider controlling airport tug 202 in instances where airport tug 202 is not operating autonomously or by way of a remote control device.

In some implementations, airport tug 202 may be configured to provide auxiliary electric power to other devices and/or vehicles that may need power at airport facility 304. For example, airport tug 202 may be configured to provide auxiliary power to aircraft 204 on the tarmac via an umbilical that extends from airport tug 202 to aircraft 204. Additionally or alternatively, airport tug 202 may be configured to provide auxiliary power to maintenance crews, emergency response crews, baggage vehicles, and/or any other suitable entity.

Airport tug 202 may be configured for autonomous navigation in a relatively controlled and/or predictable environment such as airport facility 206. Airport facility 206 may correspond to any suitable location where it may be desirable to transport aircraft 204 by way of airport tug 202. For example, airport facility 206 may correspond to a commercial service airport, a regional airport, a cargo service airport, a military service airport, a VTOL aircraft facility (e.g., that is specifically configured for manned VTOL drones/aircraft), or any other suitable type of airport facility.

To facilitate autonomous operation of airport tug 202, system 100 (e.g., processor 104 or processor 212 of airport tug 202) may be configured to monitor, based on sensor data collected by sensors 216, environmental conditions in a vicinity of airport tug 202. As used herein, "environmental conditions" may refer to any condition in a vicinity of airport tug 202 that may facilitate or otherwise affect autonomous navigation of airport tug 202 at the airport facility. For example, environmental conditions may refer to tarmac conditions, a proximity of airport tug to one or more other objects (e.g., other airport tugs, other aircraft, vehicles, airport personnel, etc.), markers on tarmac, lights, weather conditions, and/or any other suitable condition.

Based on the environmental conditions, system 100 may direct autonomous movement of airport tug 202 at the airport facility in any suitable manner. For example, while coupling portion 218 of airport tug 202 is engaged with receiving portion 220 of aircraft 204, system 100 may direct autonomous movement of airport tug 202 to transport aircraft 204 from a starting position to a designated delivery position for aircraft 204 at the airport facility.

The starting position may correspond to any suitable position at airport facility 206 where it may be desirable to have coupling portion 218 of airport tug 202 engage with receiving portion 220 of aircraft 204. For example, the starting position may correspond to a docked position of aircraft 204 at a gate of airport facility 206. In such examples, the starting position may be a location where aircraft 204 connects to a jetway at a terminal of airport facility 206. In certain alternative examples, the starting position may correspond to an end of a runway after aircraft 204 lands at airport facility 206.

The designated delivery position may correspond to any suitable position at airport facility 206 where it may be desirable to deliver aircraft 204. For example, the designated delivery position may correspond to a designated departure position on a runway where aircraft 204 is cleared to begin accelerating for takeoff. In certain alternative examples, the designated delivery position may correspond to a specific terminal or gate at airport facility 206 where passengers disembark, a maintenance area at airport facility 304, or any other suitable position. In such examples, airport tug 202 may push or pull aircraft 204 to the designated delivery position instead of the jet engines of aircraft 204 being used to taxi aircraft 204, thereby reducing fuel consumption and noise at airport facility 206.

System 100 may direct the autonomous movement of airport tug 202 in any suitable manner. For example, the monitoring of the environmental conditions may include detecting a change in the environmental conditions during the autonomous movement of airport tug 202. Based on the change in the environmental conditions, the directing of the autonomous movement of airport tug 202 may further comprise autonomously adjusting a movement of airport tug. The change may correspond to any suitable change that may occur in an airport environment at an airport facility. For example, the change in the environmental conditions may be due to the sensor data indicating that another airport tug is crossing paths or is about to cross paths in front of airport tug 202. In such examples, airport tug 202 may adjust the movement by stopping, adjusting velocity, plotting an alternate path, and/or performing any other suitable adjustment to the movement.

The sensor data and/or environmental conditions may be used in any suitable manner to facilitate autonomous navigation of airport tug 202. For example, system 100 may use the sensor data to provide instructions to actuators (e.g., which control acceleration, braking, steering, etc.) of airport tug 202 and/or to plot a path for airport tug 202 to take from the starting position to the designated delivery position. System 100 may implement any suitable process or technology to facilitate the autonomous movement of airport tug 202. For example, an exemplary process may include system 100 implementing airport specific hard coded rules (e.g., boundary restrictions, speed restrictions, distance between aircraft restrictions, etc.), obstacle avoidance algorithms, predictive modeling, machine learning algorithms, artificial intelligence operations, and/or object recognition algorithms to facilitate airport tug 202 autonomously navigating airport facility 206.

In certain examples, the autonomous movement of airport tug 202 may additionally or alternatively comprise airport tug 202 autonomously navigating toward aircraft 204 and autonomously engaging coupling portion 218 with receiving portion 220.

In certain examples, the autonomous movement of airport tug 202 may additionally or alternatively comprise airport tug 202 autonomously disengaging, after airport tug 202 and aircraft 204 arrive at the designated delivery position, coupling portion 218 of airport tug 202 from receiving portion 220 of aircraft 204.

In addition to sensor data, system 100 may use information received from an air traffic control system in any suitable manner to facilitate airport tug 202 autonomously navigating airport facility 206. Such information may include any suitable information regarding vectors (e.g., positions, velocities, headings, etc.) of objects or personnel at an airport facility that is monitored or controlled by the air traffic control system. For example, the information may include airport tug position information, aircraft position information, airport personnel position information, and/or any other suitable information. In certain examples, the information may include transport instructions or requests for an airport tug to autonomously travel to a particular location at airport facility 206 or to engage with and deliver a particular aircraft to a designated position at airport facility 206.

Figure 3:
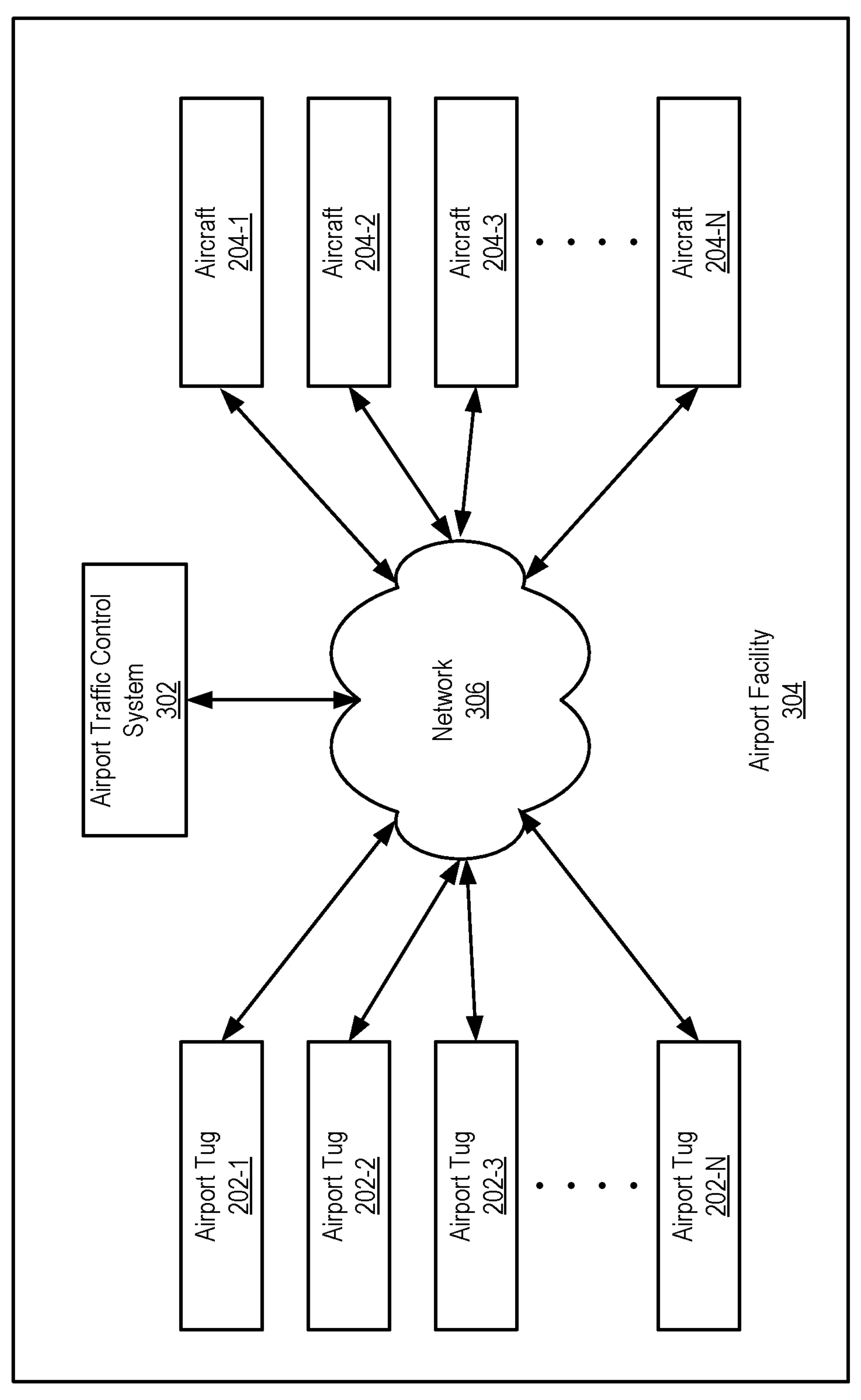

FIG. 3 shows an exemplary configuration 300 in which system 100 may be implemented in conjunction with an air traffic control system 302. As shown in FIG. 3, configuration 300 includes an airport facility 304 where a plurality of airport tugs 202 (e.g., airport tugs 202-1 through 202-N) and a plurality of aircraft 204 (e.g., aircraft 204-1 through 204-N) are located. Airport facility 304 may correspond to any suitable type of airport facility such as described herein. System 100 may be implemented entirely by one of airport tugs 202.

Alternatively, system 100 may be distributed across airport tugs 202, aircraft 204, and air traffic control system 302 or distributed across airport tugs 202, aircraft 204, air traffic control system 302, and/or any other suitable computer system/device.

As shown in FIG. 3, airport tugs 202, aircraft 204, and air traffic control system 302 are configured to communicate with each other and with an airport traffic control system 302 by way of a network 306. Network 306 may include, but is not limited to, one or more wireless networks (Wi-Fi networks), wireless communication networks, mobile telephone networks (e.g., cellular telephone networks, 5G networks, etc.), mobile phone data networks, broadband networks, narrowband networks, the Internet, local area networks, wide area networks, and any other networks capable of carrying data and/or communications signals between airport tugs 202, aircraft 204, and airport traffic control system 302. Communications between airport tugs 202, aircraft 204, airport traffic control system 302, and any other device or system may be transported using any one of the above-listed networks, or any combination or sub-combination of the above-listed networks.

In certain examples, airport tugs 202 may be configured to communicate with each other (e.g., either directly or by way of network 306) to share information regarding environmental conditions at airport facility 304 and/or facilitate autonomous navigation at airport facility 304. For example, airport tug 202-1 may be configured to communicate in any suitable manner with airport tug 202-2 to share information regarding traffic conditions, weather conditions, tarmac conditions, etc. at airport facility 304.

Airport traffic control system 302 may be implemented in any suitable manner. For example, airport traffic control system 302 may be implemented by one or more computing devices such as a central server located at a control tower of airport facility 304 or any other suitable location. Air traffic control system 302 may provide airport tugs 202 with information about the environment, such as an up-to-date map of the airport tarmac environment. Air traffic control system 302 may be configured to alert airport tugs 202 to possible congestion, potentially even optimizing airport tug routes to avoid tarmac "traffic jams," provide information regarding weather conditions, vectors of airport tugs 202, vectors of aircraft 204, vectors of airport personnel, vectors of other vehicles at airport facility 304, and/or any other suitable information. Airport traffic control system 302 may transmit such information in any suitable manner by way of network 306 to airport tugs 202 to facilitate airport tugs 202 autonomously navigating airport facility 304. For example, airport traffic control system 302 may continually stream such information to airport tugs 202 so that they have up-to-date information regarding conditions at airport facility 304. Alternatively, airport traffic control system 302 may periodically provide such information to airport tugs 202 at any suitable interval.

Figure 4:
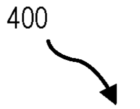
FIGS. 4-5 illustrate exemplary flow diagrams depicting various operations that may be performed according to principles described herein.
Figure 4:
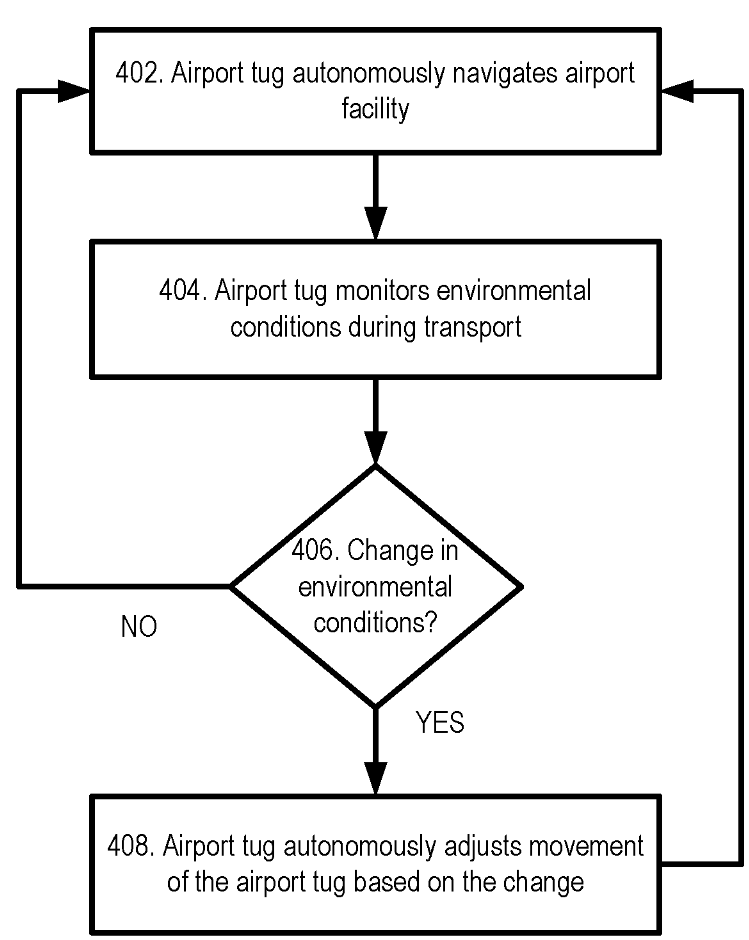

FIG. 4 shows an exemplary flow diagram 400 depicting various operations that may be performed by system 100 to facilitate, for example, airport tug 202-1 autonomously navigating airport facility 304. At operation 402, airport tug 202-1 may autonomously navigate airport facility 304. In certain examples, such autonomous navigation at operation 402 may occur while airport tug 202-1 is not engaged with an aircraft. In certain additional or alternative examples, operation 402 may occur while airport tug 202-1 is engaged with and is transporting an aircraft at airport facility 304.

At operation 404, airport tug 202-1 monitors environmental conditions during autonomous navigation. For example, airport tug 202-1 may use one or more of sensors 216 to monitor environmental conditions in a vicinity of airport tug 202-1. At operation 408, airport tug 202-1 may determine whether there has been a change in the environmental conditions. For example, the change in the environmental conditions may include airport tug 202-1 detecting, in any suitable manner, that there is a baggage cart about to cross paths in front of airport tug 202-1 while airport tug 202-1 is traveling to a terminal to engage with an aircraft. If the answer at operation 406 is "No," the flow may return to operation 402 and airport tug 202-1 may continue to navigate autonomously (e.g., along a route autonomously determined by airport tug 202-1).

If the answer at operation 406 is "Yes," the flow may proceed to operation 408 and airport tug 202-1 may autonomously adjust movement of airport tug 202-1 based on the change. For example, in response to detecting of the baggage cart, airport tug 202-1 may decrease speed and stop any suitable distance away from the baggage cart to avoid a collision.

Figure 5:
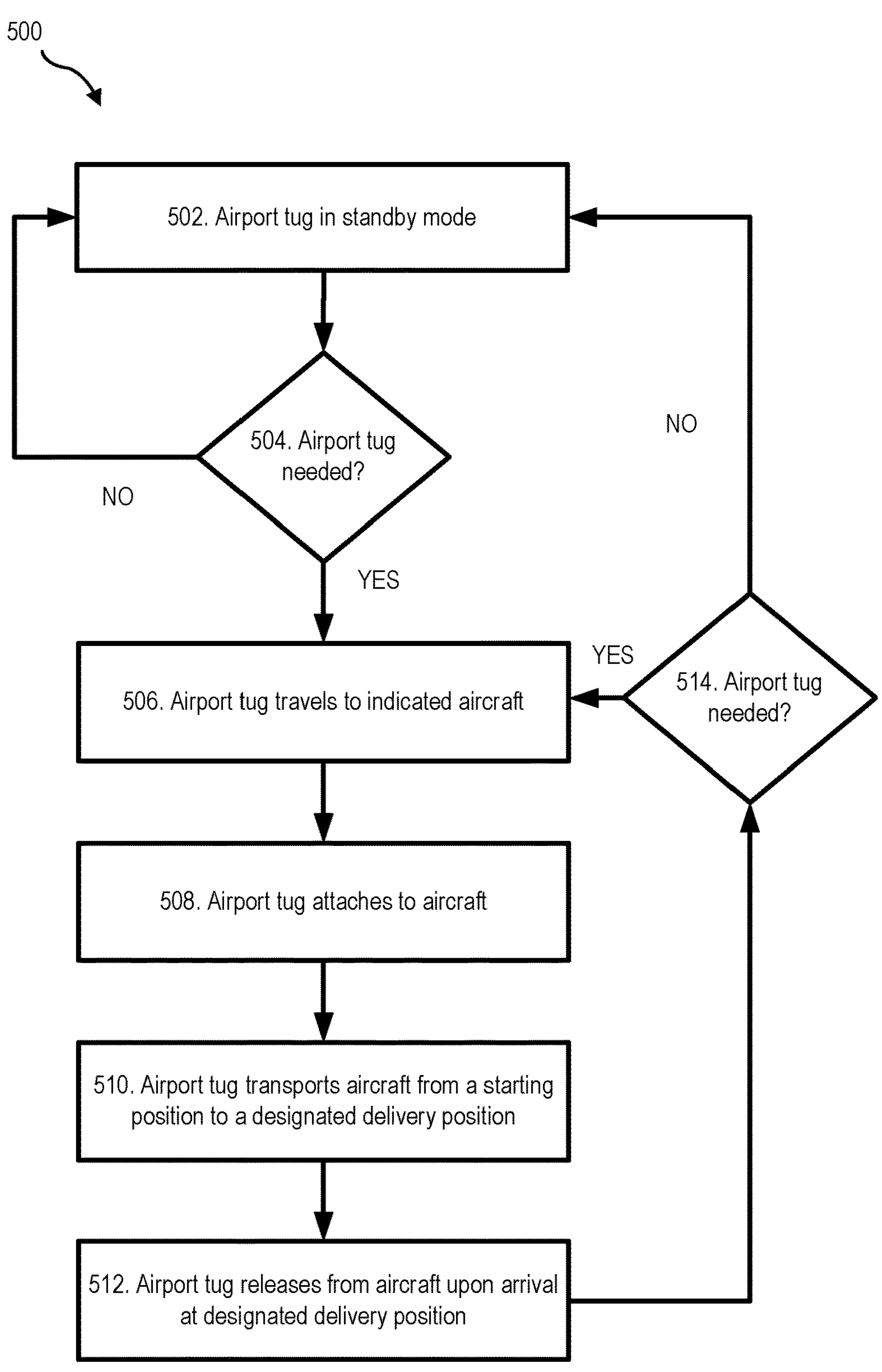

FIG. 5 shows another exemplary flow diagram 500 depicting various operations that may be performed by system 100 to facilitate, for example, airport tug 202-1 autonomously navigating airport facility 304. At operation 502, airport tug 202-1 may be in a standby mode during which airport tug 202-1 is available to be used in any suitable manner such as described herein. At operation 504, airport tug 202-1 may determine whether airport tug 202-1 is needed, for example, to transport an aircraft at airport facility 304. Such a determination may be made in any suitable manner. For example, airport tug 202-1 may receive an instruction from airport traffic control system 302 that indicates that a particular one of aircraft 204 at a particular terminal at airport facility 304 is ready to be transported. If the answer at operation 504 is "No," the flow may return to operation 502.

If the answer at operation 504 is "Yes," airport tug 202-1 may travel to the aircraft at operation 506. For example, airport tug 202-1 may travel to an indicated terminal, gate, etc. where aircraft 204-1 is located and is indicated as being ready for transport. In certain examples, airport tug 202-1 may autonomously travel to aircraft 204-1. In certain alternative examples, airport tug 202-1 may travel to aircraft 204-1 under control of a remote operator. For example, the remote operator may be a pilot in a cockpit of the aircraft transported by airport tug 202-1. Alternatively, the remote operator may be a human operator located in a control tower of airport facility 304.

At operation 508, airport tug 202-1 may attach to aircraft 204-1 in any suitable manner. In certain examples, airport tug 202-1 may autonomously engage coupling portion 218 of airport tug 202-1 with receiving portion 220 of aircraft 204-1. Alternatively, airport tug 202-1 may be controlled by a remote operator or a human rider to attach airport tug 202-1 to aircraft 204-1.

Figure 6:
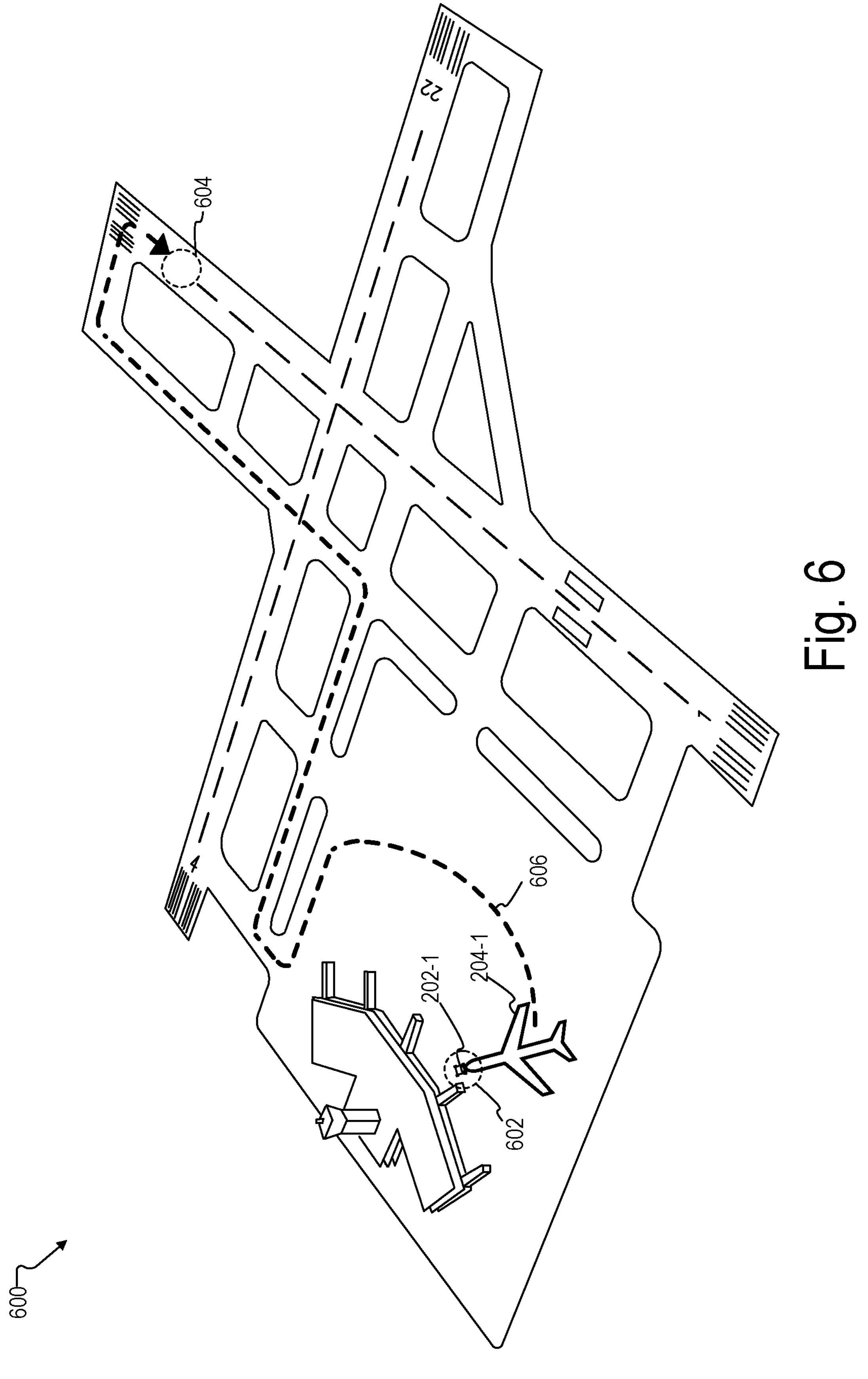
FIG. 6 illustrates an exemplary view of an airport facility according to principles described herein.

At operation 510, airport tug 202-1 may transport (e.g., autonomously, semi-autonomously (e.g., using an adaptive cruise control function), or by way of remote control) aircraft 204-1 from a starting position to a designated delivery position at airport facility 304. To illustrate an example, FIG. 6 shows an exemplary view 600 of an airport facility where airport tug 202-1 may be used to transport aircraft 204-1 from a gate at a terminal of an airport facility to a predefined position on a runway. As shown in FIG. 6, a starting position 602 is indicated by a dashed circle at the terminal and a designated departure position 604 is indicated as another dashed circle on a runway. Designated departure position 604 represents a position where aircraft 204-1 is cleared to begin accelerating on the runway for takeoff. A dashed line 606 represents a route that airport tug 202-1 may generate and follow to autonomously transport aircraft 204-1 to designated departure position 604. Dashed line 606 is depicted in FIG. 6 for illustrative purposes to show an exemplary route that airport tug may take. It is understood that dashed line 606 may not actually be visible on the tarmac of the airport facility depicted in FIG. 6. Moreover, it is understood that the route depicted by dashed line 606 may change dynamically as conditions on the tarmac change. For example, a baggage cart may obstruct the route depicted by dash line 606 after the route is plotted by airport tug 202-1. In response, airport tug 202-1 may generate an updated route to avoid the baggage cart.

Returning to FIG. 5, airport tug 202-1 may release from aircraft 204-1 upon arrival at the designated delivery position. In examples where the designated delivery position corresponds to a designated departure position, airport tug 202-1 may then travel any suitable distance from aircraft 204-1 such that aircraft 204-1 is cleared for takeoff. In certain examples, such a release may be performed autonomously by airport tug 202-1. Alternatively, the release may be performed by way of direction from a remote operator in, for example, the cockpit of aircraft 204-1 or the control tower at the airport facility.

At operation 514, airport tug 202-1 makes another determination whether airport tug 202-1 is needed. For example, the determination may be made based on airport tug 202-1 receiving an additional instruction from air traffic control system 302 that, for example, aircraft 204-2 is ready for transport (e.g., at an additional terminal, at the end of a runway post-landing, etc.). Based on the additional instruction, the answer at operation 514 is "Yes," the flow returns to operation 506, and airport tug 202-1 travels to the aircraft. If the answer at operation 514 is "No," the flow returns to operation 502 where airport tug 202-1 returns to a standby mode.

Figure 7:
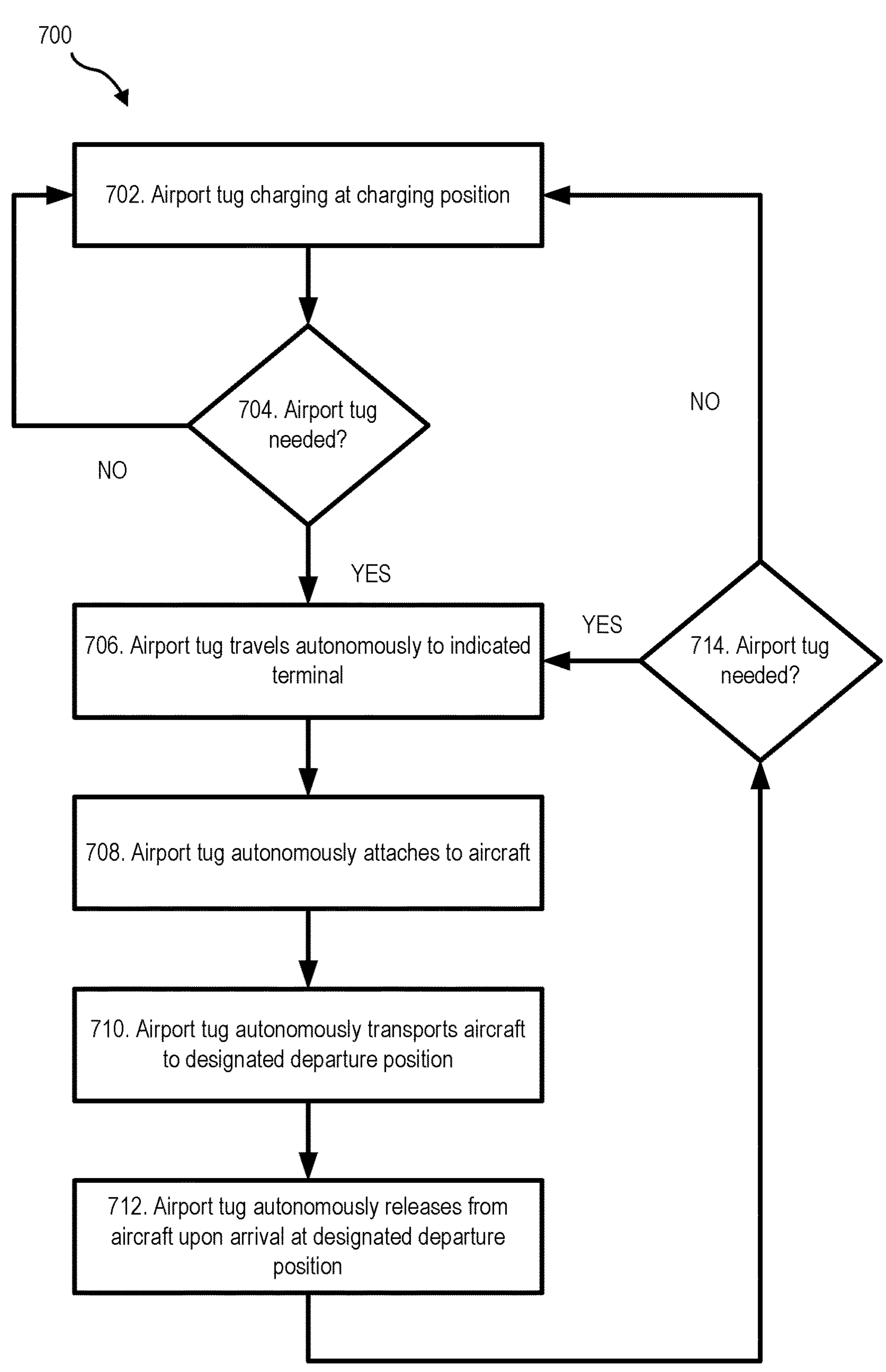
FIGS. 7-8 illustrate additional exemplary flow diagrams depicting various operations that may be performed according to principles described herein.

FIG. 7 shows an exemplary flow diagram 700 depicting various operations that may be performed by system 100 in implementations where an airport tug such as airport tug 202-1 is electrically powered. At operation 702, airport tug 202-1 may be charging at a charging position. Such a charging position may be configured in any suitable manner. For example, the charging position may correspond to a designated location at airport facility 304 that has charging cables, inductive charging pads, or any other suitable charging mechanism configured to charge the batteries of an electrically powered airport tug.

At operation 704, airport tug 202-1 may determine whether airport tug 202-1 is needed. If the answer at operation 704 is "No," the flow may return to operation 704 and airport tug 202-1 may continue to charge or wait at the charging position. In certain examples, airport tug 202-1 may only leave the charging position when summoned if airport tug 202-1 has sufficient power for a requested delivery operation. In such examples, system 100 may determine in any suitable manner whether airport tug 202-1 has sufficient power for a requested delivery operation. If airport 202-1 is not sufficiently charged for the requested delivery operation, airport tug 202-1 may remain at the charging position and an additional airport tug that is sufficiently charged may be selected (e.g., from a list of available airport tugs) for the requested delivery operation.

If the answer at operation 704 is "Yes," (e.g., due to an instruction provided by airport traffic control system 302) the airport tug may autonomously travel to a terminal where, for example, aircraft 204-1 is located. At operation 708, airport tug 202-1 may autonomously attach to aircraft 204-1 in any suitable manner. At operation 710, airport tug 202-1 may autonomously transport aircraft 204-1 to a designated departure position.

At operation 712, airport tug 202-1 may autonomously release from aircraft 204-1 upon arrival at the designated departure position. Airport tug 202-1 may then autonomously navigate away from aircraft 204-1 to clear aircraft 204-1 for departure.

At operation 714, airport tug 202-1 may determine whether airport tug 202-1 is needed. If the answer at operation 714 is "Yes," the flow may proceed to operation 706 and airport tug 202-1 may travel to an additional aircraft. If the answer at operation 714 is "No," the flow may proceed to operation 702 and airport tug 202-1 may return to the charging position to recharge batteries of airport tug 202-1.

In certain examples, airport tugs such as those described herein may be configured to switch between autonomous navigation at an airport facility and remote control navigation as directed by a remote operator. A remote operator may correspond to any human operator that is not riding on the airport tug. For example, a remote operator may correspond to a pilot in an aircraft being transported by the airport tug, an air traffic controller in a control tower, or a grounds crew member.

System 100 may determine when to switch airport tug 202 from autonomous navigation to remote control navigation based on satisfaction of a predefined condition. In certain examples, system 100 may automatically switch to remote control navigation based on satisfaction of the predefined condition. In certain alternative implementations, system 100 may determine that the predefined condition has been satisfied and then provide any suitable notification indicating that remote control operation is available unless otherwise recommended in a given situation.

The predefined condition may correspond to any suitable condition that may trigger remote control operation of airport tugs 202. For example, in certain implementations, the predefined condition may correspond to a user input provided by a user that wants to remotely control one of airport tugs 202. In such examples, the user input may be provided in any suitable manner by a remote operator. For example, a pilot in a cockpit of an airplane that is to be transported by one of airport tugs 202 may provide a user input by way of a control interface of the airplane or by way of a dedicated remote control device to assume control of one of airport tugs 202. The pilot may then remotely control movement of the airport tug by way of any suitable control interfaces of the aircraft or by way of a dedicated remote control device operated by the pilot while within the cockpit of the aircraft.

In certain examples, the predefined condition may be associated with a change in engagement status of the airport tug. For example, the airport tug may automatically switch from operating autonomously to remote control operation upon being connected to or disconnected from an aircraft.

In certain examples, the predefined condition may be associated with an airport tug entering a predefined area at an airport facility. For example, an area at a gate of a terminal may correspond to a predefined area where an airport tug is configured to automatically switch from operating autonomously to remote control operation. In such examples, an airport tug may be controlled as directed by remote operator while in the predefined area to attach the coupling portion of the airport tug to a receiving portion of an aircraft. Once attached, the airport tug may be configured to automatically transport the aircraft in any suitable manner such as described herein.

In certain examples, the predefined condition may be associated with conditions in the environment at an airport facility. For example, certain weather conditions (e.g., rain, fog, sleet, snow, etc.) may trigger an airport tug switching from autonomous navigation to remote control navigation. In such examples, the airport tug may determine based on sensor data or other information that the weather conditions are unsafe for autonomous navigation. Such a determination may be made at any suitable time. For example, such a determination may be made while the airport tug is autonomously transporting an aircraft from a starting position to a designated departure position at the airport. The airport tug may then provide any suitable notification to, for example, the pilot of the aircraft being transported to indicate that remote control operation of the airport tug is recommended.

In addition, certain traffic conditions at an airport facility may trigger an airport tug switching from autonomous navigation to remote control navigation. For example, there may be a long queue of airplanes taxiing toward a runway and waiting in line for clearance to take off, which may make autonomous operation of the airport tug difficult. In such examples, the airport tug may provide any suitable notification to, for example, an air traffic controller to indicate that remote control operation of the airport tug is recommended.

In certain examples, system 100 may switch from remote control operation to autonomous operation of an airport tug based on system 100 detecting satisfaction of an additional predefined condition that triggers autonomous operation of the airport tug. Based on the satisfaction of the additional predefined condition, the airport tug may switch from navigating the airport facility as directed by a remote operator to navigating the airport facility autonomously. The additional predefined condition may correspond to any suitable condition that may trigger autonomous operation of an airport tug. For example, a remote operator may provide any suitable user input to direct an airport tug to begin autonomous operation at an airport facility. In certain alternative implementations, an airport tug may automatically switch back to autonomous operation upon being disengaged from an aircraft.

Figure 8:
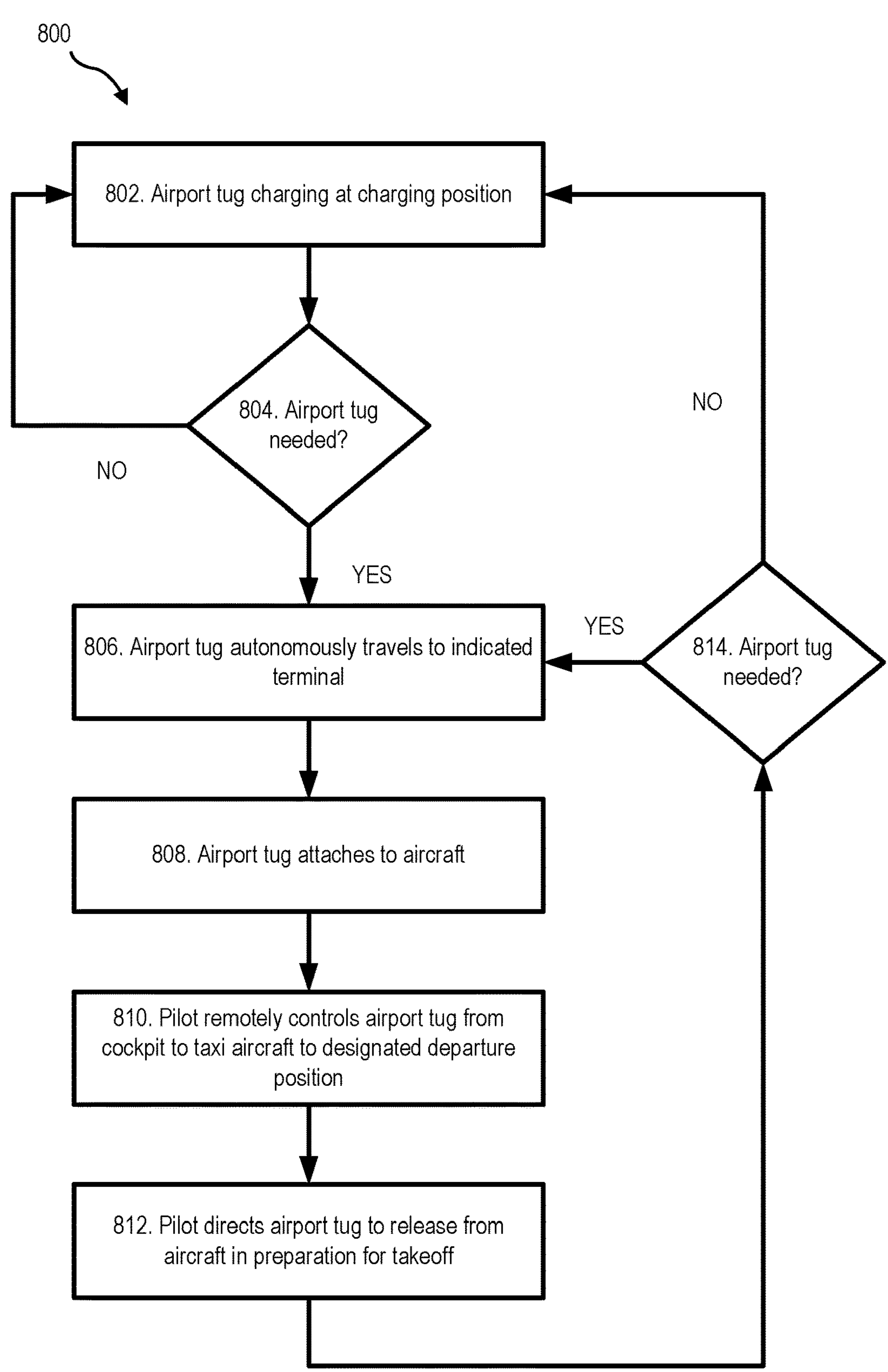

FIG. 8 shows an exemplary flow diagram 800 that depicts various operations that may be performed in an alternative implementation where an airport tug is controlled as directed by a remote operator while taxiing. At operation 802, for example, airport tug 202-1 may be charging at a charging position. At operation 804, a determination is made in any suitable manner such as described herein whether airport tug 202-1 is needed. If the answer at operation 804 is "No," the flow returns to operation 802. If the answer at operation 804 is "Yes," the flow proceeds to operation 806 and airport tug 202-1 autonomously travels to an indicated terminal where, for example, aircraft 204-1 is located.

At operation 808, airport tug 202-1 may attach to aircraft 204-1. This may be performed in any suitable manner, for example, either autonomously or as directed by a remote operator. At operation 810, a pilot may remotely control airport tug 202-1 from the cockpit of aircraft 204-1 to taxi aircraft 204-1 to a designated departure position. In such an example, the pilot may provide any suitable user input to assume control of the airport tug. Alternatively, airport tug 202 may automatically switch from autonomous navigation to remote control navigation upon being attached to aircraft 204-1. While the pilot remotely controls airport tug 202-1, the engines of aircraft 204-1 are not used to propel the aircraft towards the designated departure position. Rather, airport tug 202-1 provides all of the motive power to transport aircraft 204-1. In so doing, it is possible to beneficially reduce fuel consumption by aircraft 204-1 and reduce noise made by aircraft 204-1 while taxiing.

At operation 812, the pilot directs airport tug 202-1 to release from aircraft 204-1 in preparation for takeoff. In such examples, airport tug 202-1 may autonomously navigate away from aircraft 204-1 to clear aircraft 204-1 for departure. At operation 814, a determination is made whether airport tug 202-1 is needed. If the answer at operation 814 is "Yes," the flow returns to operation 806 and airport tug 202-1 may autonomously navigate to another terminal or any other suitable location where, for example, aircraft 204-3 is located. If the answer at operation 814 is "No," the flow may return to operation 802 and airport tug 202-1 may autonomously navigate to the charging position at the airport facility.

In certain examples, airport tugs such as those described herein may be configured to be inductively charged while the airport tugs move around an airport facility or otherwise transport aircraft at the aircraft facility. In such examples, inductive charging coils or pads may be embedded in any suitable manner within the tarmac and along routes that airport tugs typically travel. With such a configuration, the airport tugs may be configured to operate continuously without having to, for example, return to a designated charging position after one or more trips transporting aircraft.

In certain examples, airport tugs such as those described herein may be used (e.g., autonomously, by way of a remote operator, or a human driver) to pull baggage car trains around the tarmac, or other tarmac uses. For example, the airport tug may be fitted with other useful equipment to aid in situations that may be dangerous or undesirable for humans. For example, an electrically powered, autonomous airport tug outfitted with fire suppression equipment could charge into a jet-fuel consuming fiery crash without risking a human firefighter's life. Not only would risk to a human firefighter be reduced, but the airport tug may be able to arrive more quickly than a human fire crew, use its sensors to "see" things a human firefighter might not be able to easily see (e.g., thermal imaging cameras spotting crash survivors through smoke and wreckage) and be able to drive into the fire and wreckage to apply fire retardant at places a human firefighter may not be able to safely go. An airport tug with these kinds of capabilities could also be piloted at a distance as directed by human firefighters to facilitate suppressing a fire, assessing a crash scene, and/or helping crash survivors.

Figure 9:
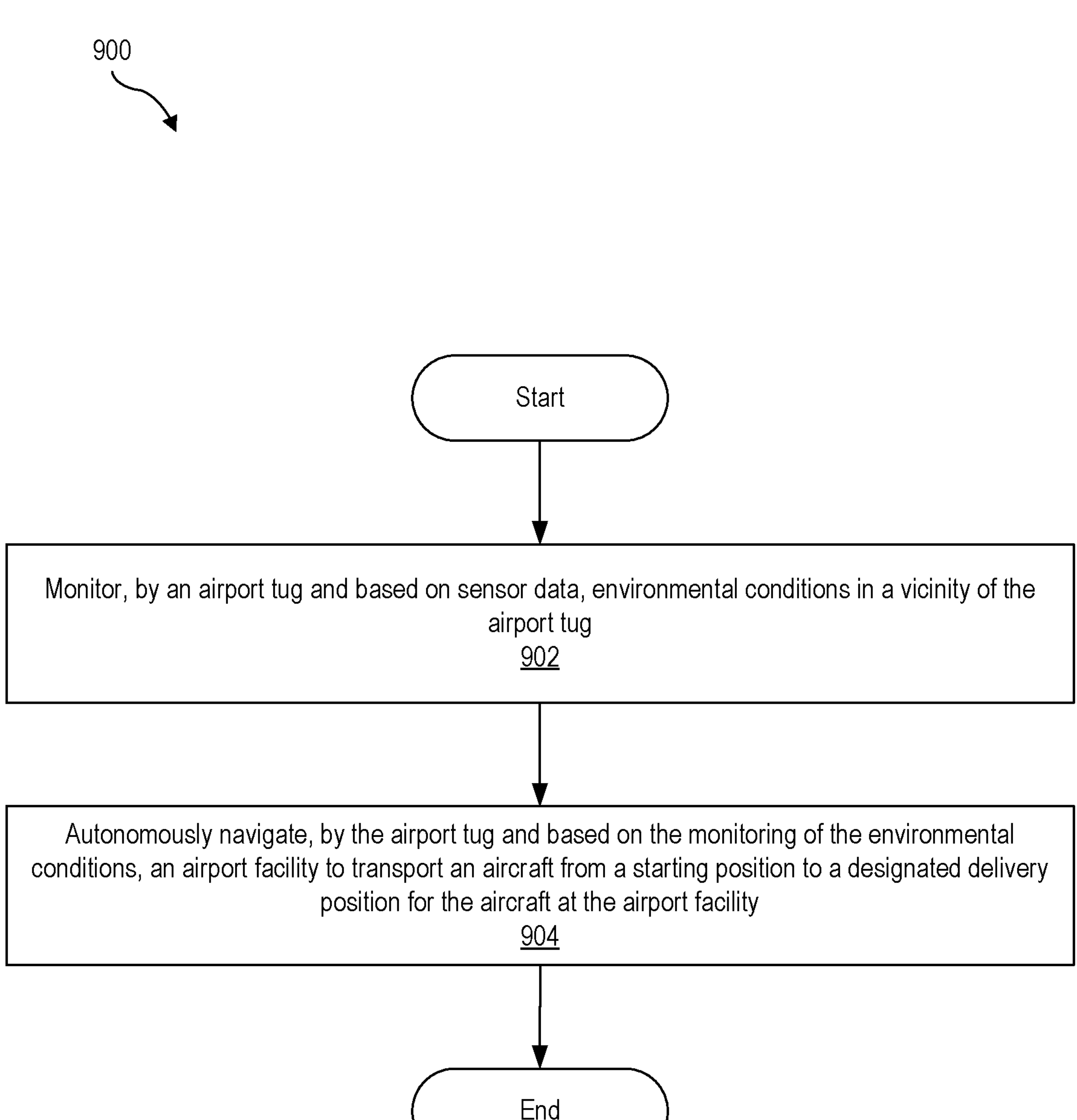
FIG. 9 illustrates an exemplary method of operation of an airport tug according to principles described herein.

FIG. 9 illustrates an exemplary method 900 of operation of an airport tug (e.g., airport tug 202). While FIG. 9 illustrates exemplary operations according to one embodiment, other embodiments may add to and/or modify the operations shown in FIG. 9. The operations shown in FIG. 9 may be performed by an airport tug, any components included therein, and/or any implementation thereof.

At operation 902, the airport tug may monitor, based on sensor data collected by way of one or more sensors of the airport tug, environmental conditions in a vicinity of the airport tug. Operation 902 may be performed in any of the ways described herein.

At operation 904, the airport tug may autonomously navigate, based on the monitoring of the environmental conditions and while a coupling portion of the airport tug is engaged with a receiving portion of an aircraft, an airport facility to transport the aircraft from a starting position to a designated departure position at the airport facility or transport an arriving aircraft from the runway to a designated terminal for disembarkation. Operation 904 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory (RAM), and an optical disc (e.g., a compact disc, a digital video disc, a Blu-ray disc, etc.). Exemplary volatile storage media include, but are not limited to, RAM (e.g., dynamic RAM).

Figure 10:
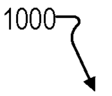
FIG. 10 illustrates an exemplary computing device according to principles described herein.
Figure 10:
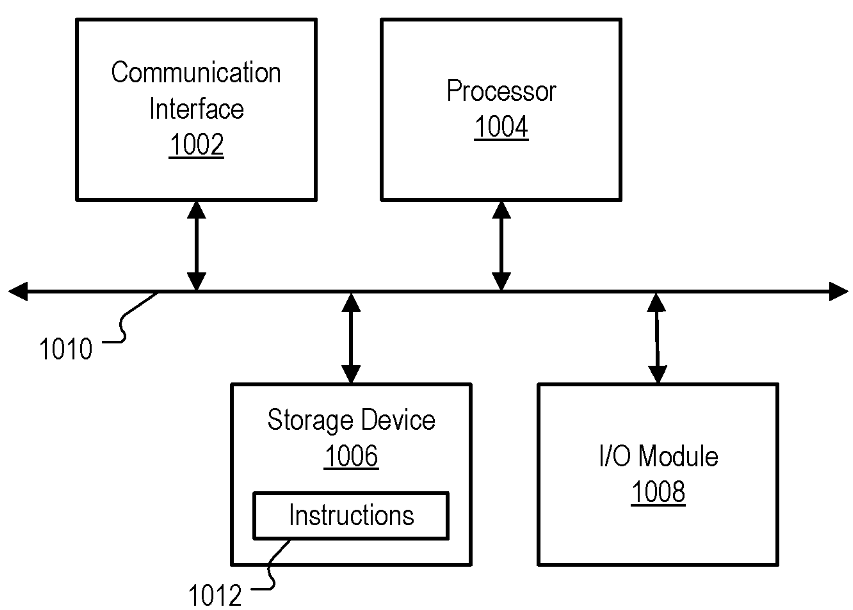

FIG. 10 illustrates an exemplary computing device 1000 that may be specifically configured to perform one or more of the processes described herein. As shown in FIG. 10, computing device 1000 may include a communication interface 1002, a processor 1004, a storage device 1006, and an input/output (I/O) module 1008 communicatively connected one to another via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data and/or interpreting, executing, and/or directing execution of one or more of the instructions, processes, and/or operations described herein. Processor 1004 may perform operations by executing computer-executable instructions 1012 (e.g., an application, software, code, and/or other executable data instance) stored in storage device 1006.

Storage device 1006 may include one or more data storage media, devices, or configurations and may employ any type, form, and combination of data storage media and/or device. For example, storage device 1006 may include, but is not limited to, any combination of the non-volatile media and/or volatile media described herein. Electronic data, including data described herein, may be temporarily and/or permanently stored in storage device 1006. For example, data representative of computer-executable instructions 1012 configured to direct processor 1004 to perform any of the operations described herein may be stored within storage device 1006. In some examples, data may be arranged in one or more location databases residing within storage device 1406.

I/O module 1008 may include one or more I/O modules configured to receive user input and provide user output. One or more I/O modules may be used to receive input for a virtual experience. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1408 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 1000. For example, memory 102 or memory 208 may be implemented by storage device 1006, and processor 104 or processor 212 may be implemented by processor 1004.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. An airport tug configured to navigate an airport facility autonomously, the airport tug comprising:

- a coupling portion configured to engage with a receiving portion of an aircraft;
- one or more sensors configured to collect sensor data descriptive of environmental conditions in a vicinity of the airport tug;
- a memory storing instructions; and
- one or more processors communicatively coupled to the memory and configured to execute the instructions to perform a process comprising:
  - monitoring, based on the sensor data, the conditions in the vicinity of the airport tug;
  - directing, based on the monitoring of the conditions and while the coupling portion is engaged to the receiving portion, autonomous movement of the airport tug according to a route automatically generated based on the sensor data to transport the aircraft from a starting position to a designated delivery position for the aircraft at the airport facility;

detecting, based on the sensor data, a change in the conditions during the autonomous movement of the airport tug according to the route automatically generated via the sensor data;

accessing vector information associated with one or more entities at the airport facility, the vector information indicating at least position information and heading information for the one or more entities;

automatically generating an updated route from a current position of the airport tug based on (i) the detected change in the conditions and (ii) the vector information associated with the one or more entities; and after generating the updated route, directing autonomous movement of the airport tug according to the updated route.

2. The airport tug of claim 1, wherein the directing of the autonomous movement of the airport tug according to the updated route further comprises:

disengaging, after the airport tug and aircraft arrive at the designated delivery position, the coupling portion of the airport tug from the receiving portion of the aircraft; and navigating away from the aircraft.

3. The airport tug of claim 1, wherein the airport tug is electrically powered.

4. The airport tug of claim 3, wherein the directing of the autonomous movement of the airport tug according to the updated route further comprises autonomously navigating to a charging position for the airport tug at the airport facility.

5. The airport tug of claim 3, wherein the airport tug is configured to be inductively charged while the airport tug transports the aircraft from the starting position to the designated delivery position for the aircraft.

6. The airport tug of claim 1, wherein the process further comprises:

detecting satisfaction of a predefined condition that triggers remote control operation of the airport tug; and switching, based on the satisfaction of the predefined condition, the airport tug from navigating the airport tug autonomously to navigating the airport tug as directed by a remote operator.

7. The airport tug of claim 6, wherein the remote operator is positioned in a control tower of the airport facility or a cockpit of the aircraft.

8. The airport tug of claim 6, wherein the process further comprises:

detecting satisfaction of an additional predefined condition that triggers autonomous operation of the airport tug; and switching, based on the satisfaction of the additional predefined condition, the airport tug from navigating the airport tug as directed by the remote operator to navigating the airport tug autonomously.

9. The airport tug of claim 1, wherein the process further comprises:

directing autonomous navigation of the airport tug toward the aircraft; and directing autonomous engagement of the coupling portion of the airport tug with the receiving portion of the aircraft.

10. The airport tug of claim 1, wherein:

the starting position corresponds to a docked position of the aircraft at a gate of the airport facility; and the designated delivery position corresponds to a designated departure position on a runway where the aircraft is cleared to begin accelerating for takeoff.

11. The airport tug of claim 1, wherein:

the starting position corresponds to an end of a runway after the aircraft lands at the airport facility; and the designated delivery position corresponds to a terminal where the aircraft docks and passengers disembark.

12. A system comprising:

a plurality of airport tugs configured to navigate an airport facility autonomously, wherein an airport tug included in the plurality of airport tugs includes:

one or more sensors configured to collect sensor data descriptive of environmental conditions in a vicinity of the airport tug;

a memory storing instructions; and one or more processors communicatively coupled to the memory and configured to execute the instructions to perform a process comprising:

receiving information from an airport traffic control system configured to control arrivals and departures of a plurality of aircraft at the airport facility;

monitoring, based on the sensor data, the conditions in the vicinity of the airport tug;

directing, based on the information received from the airport traffic control system and based on the conditions, autonomous movement of the airport tug according to a route automatically generated based on the sensor data to transport an aircraft included in the plurality of aircraft from a starting position to a designated delivery position for the aircraft at the airport facility;

detecting, based on the sensor data, a change in the conditions during the autonomous movement of the airport tug according to the route automatically generated via the sensor data;

accessing vector information received from the airport traffic control system, the vector information indicating at least position information and heading information for one or more entities at the airport facility;

automatically generating an updated route from a current position of the airport tug based on (i) the detected change in the conditions and (ii) the vector information received from the airport traffic control system; and after generating the updated route, directing autonomous movement of the airport tug according to the updated route.

13. The system of claim 12, wherein the information received from the airport traffic control system includes one or more of airport tug position information; aircraft position information; and airport personnel position information.

14. The system of claim 12, wherein the process further comprises:

detecting satisfaction of a predefined condition that triggers remote control operation of the airport tug; and switching, based on the satisfaction of the predefined condition, the airport tug from navigating the airport tug autonomously to navigating the airport tug as directed by a remote operator.

15. The system of claim 12, wherein:

the starting position corresponds to a docked position of the aircraft at a gate of the airport facility; and the designated delivery position corresponds to a designated departure position on a runway where the aircraft is cleared to begin accelerating for takeoff.

16. A method comprising:

monitoring, by an airport tug and based on sensor data collected by way of one or more sensors of the airport tug, conditions in a vicinity of the airport tug;

autonomously navigating, according to a route automatically generated based on the sensor data and while a coupling portion of the airport tug is engaged to a receiving portion of an aircraft, an airport tug to transport the aircraft from a starting position to a designated delivery position for the aircraft at an airport facility;

while autonomously navigating the airport tug according to the route automatically generated based on the sensor data, detecting, based on sensor data collected by the one or more sensors and during autonomous navigation of the airport tug according to the automatically generated route, satisfaction of a predefined condition that triggers remote control operation of the airport tug; and automatically switching, in response to satisfaction of the predefined condition indicated by the sensor data collected by the one or more sensors and during autonomous navigation of the airport tug according to the automatically generated route, from autonomous navigation of the airport tug to navigation of the airport tug as directed by a remote operator.

17. The method of claim 16, wherein:

the starting position corresponds to a docked position of the aircraft at a gate of the airport facility; and the designated delivery position corresponds to a designated departure position on a runway where the aircraft is cleared to begin accelerating for takeoff.

18. The method of claim 16, wherein the predefined condition comprises a weather condition detected via the one or more sensors.

19. The method of claim 16, wherein the predefined condition comprises the airport tug entering a predefined geographic zone within the airport facility.

* * * * *